United States Patent
Nakajima et al.

(10) Patent No.: US 6,421,615 B1
(45) Date of Patent: Jul. 16, 2002

(54) TORSIONAL VIBRATION MEASURING INSTRUMENT AND TORSIONAL VIBRATION MEASURING METHOD

(75) Inventors: Sadakazu Nakajima; Yasunori Mukawa, both of Osaka; Hiroshi Osugi, Tokyo, all of (JP)

(73) Assignee: Yanmar Diesel Engine Co., Ltd., Osaka (JP)

(*) Notice: Subject to any disclaimer, the term of this patent is extended or adjusted under 35 U.S.C. 154(b) by 0 days.

(21) Appl. No.: 09/381,153

(22) PCT Filed: Mar. 9, 1998

(86) PCT No.: PCT/JP98/00958

§ 371 (c)(1),
(2), (4) Date: Dec. 6, 1999

(87) PCT Pub. No.: WO98/41821

PCT Pub. Date: Sep. 24, 1998

(30) Foreign Application Priority Data

Mar. 14, 1997 (JP) ................................. 9-60912

(51) Int. Cl.[7] ........................................... G01H 17/00
(52) U.S. Cl. ............................. 702/43; 702/86
(58) Field of Search ................. 702/41–43, 85, 702/86–94, 151, 199

(56) References Cited

FOREIGN PATENT DOCUMENTS

| JP | 55-1712 | 1/1980 |
|----|---------|--------|
| JP | 57-6052 | 2/1982 |
| JP | 57-179628 | 11/1982 |
| JP | 59-222714 | 12/1984 |
| JP | 61-12026 | 1/1986 |
| JP | 62-291519 | 12/1987 |
| JP | 02-21533 | 2/1990 |
| JP | 06-307922 | 11/1994 |
| JP | 7-43206 | * 2/1995 |
| JP | 9-33337 | * 2/1997 |

* cited by examiner

Primary Examiner—Marc S. Hoff
Assistant Examiner—Craig Steven Miller
(74) Attorney, Agent, or Firm—Jordan and Hamburg LLP (57) ABSTRACT

A torsional vibration measuring instrument which can be placed in a narrow space to measure the torsional vibration of a rotated object, is portable, avoids the possibility of occurrence of unrecorded data, stores recorded data in a detachable storage means, can be attached to a portable data analyzing/processing device, and can transmit the analyzed data. A portable torsional vibration measuring instrument (data logger) has a display means which can display at least the rotational speed and the torsional amplitude and a storage means in which recorded data are stored and which is detachably attached to the casing of the instrument. By attaching the storage means to a portable data analyzing/processing device (notebook personal computer), frequency analysis can be carried out and the recorded data stored in the storage means can be transmitted.

9 Claims, 13 Drawing Sheets

TORSIONAL VIBRATION MEASURING INSTRUMENT AND TORSIONAL VIBRATION MEASURING METHOD

BACKGROUND OF THE INVENTION

The present invention relates to a torsional vibration measuring instrument and a torsional vibration measuring method especially for measuring the fluctuation of displacement of rotational angle of a rotary shaft in a diesel engine and the like for shipboard or electric power generation.

A rotary shaft of a shipboard large diesel engine or the like for transmitting power to a load is subject to torsional vibration caused by intermittent explosion in a piston or pistons of the engine, thereby producing resonance with natural frequency according to the length of the rotary shaft. From standpoints of safety and basic performance capacities, the torsional vibration must be detected for preventing the engine from such resonance and noise. Conventionally, there has been used an instrument for measuring such torsional vibration.

Figure 11:
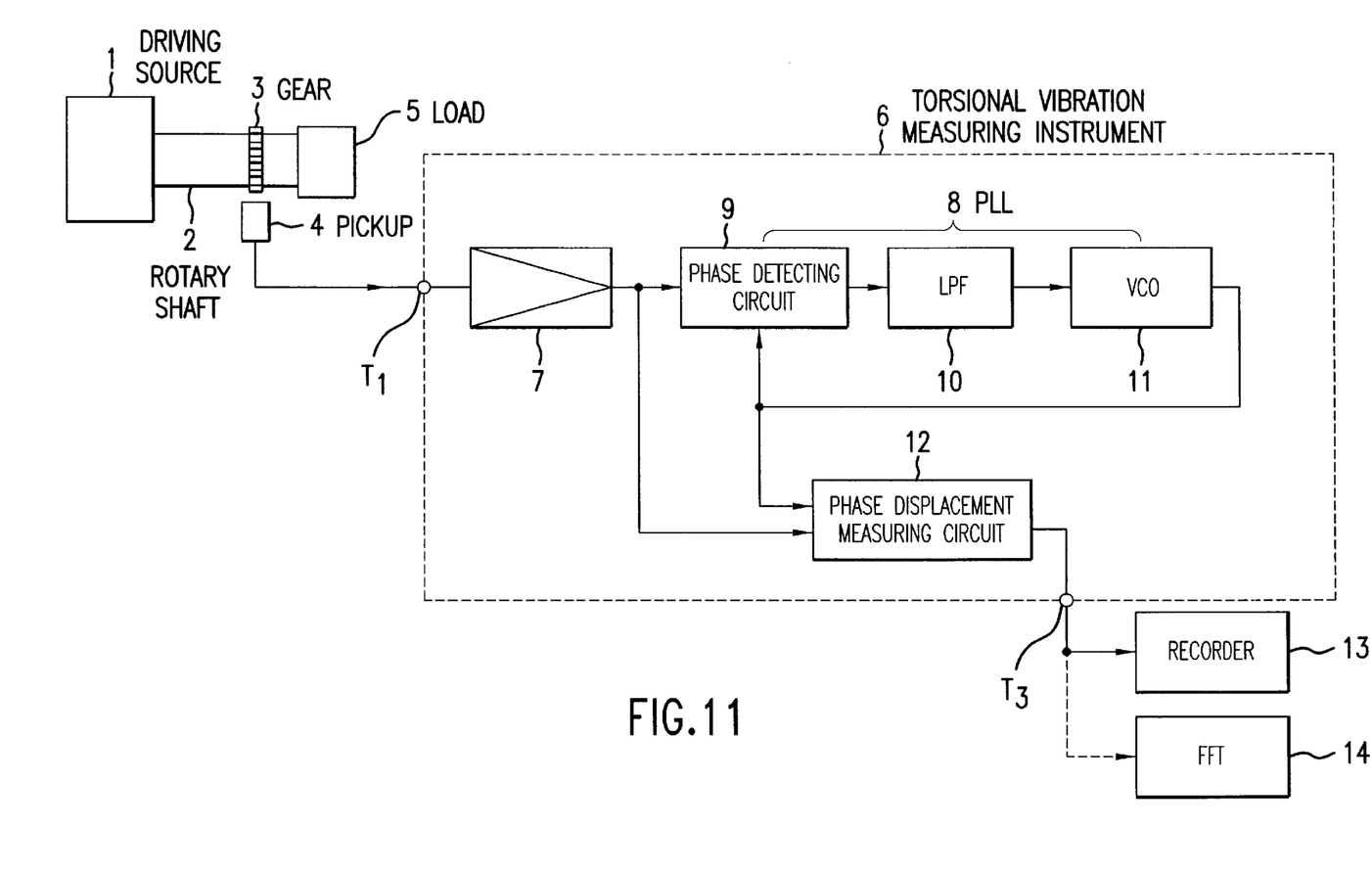
FIG. 11 is an operational diagram of a conventional torsional vibration measuring instrument.

Referring to FIG. 11 showing the system of the conventional analog torsional vibration measuring instrument (disclosed in Japanese Patent No. Hei 1-27067), a load 5 is supplied with the rotational driving power from a driving source 1 like an engine through a rotary shaft 2.

A gear 3, which has a determined number of teeth, is fixed onto a certain portion of rotary shaft 2. Gear 3 and a pickup 4, e.g. electromagnetically operated, which is opposed to gear 3, constitute a rotation detector (hereinafter, an encoder).

Pickup 4 detects rotation pulses every rotation of rotary shaft 2 at a predetermined angle θ, and transmits the detected pulses to an input terminal $T_1$ of a torsion vibration measuring instrument 6.

Rotation pulses, through input terminal $T_1$, are amplified by an amplifier 7, and are transmitted to a phase detecting circuit 9 of a phase lock loop (PLL) 8, so as to measure the phase displacement between the pulses from pickup 4 and those generated by a voltage control oscillating (VCO) circuit 11.

The detected phase displacement signal is smoothed through a low pass filter (LPF) 10. The signal filtrated by LPF 10 is changed by VCO 11 into a voltage corresponding to a natural frequency in proportion to the rotational speed of rotary shaft 2 without torsional vibration. VCO 11 outputs reference pulses with a frequency corresponding to the voltage, so as to transmit them to both phase detecting circuit 9 and a phase displacement measuring circuit 12.

Phase displacement measuring circuit 12 also receives rotation pulses to be measured from the encoder through amplifier 7.

As disclosed in Japanese Patent No. Sho 57-6052, phase displacement measuring circuit 12 is configured to calculate the digital value of displacement between both the inputs every input period, i.e., the phase displacement between the reference pulse from VCO 11 and the rotation pulse to be measured from the encoder, which corresponds to the angular fluctuation generated by the torsional vibration of rotary shaft 2, so as to transmit it to an output terminal $T_3$. Output terminal $T_3$ is connected through a cord or the like with a chart recorder 13, an FFT (a fast Fourier transform) analyzer 14 or the like for recording and analysis of a torsion angle in relation to a crank angle or rotational angle.

Figure 12:
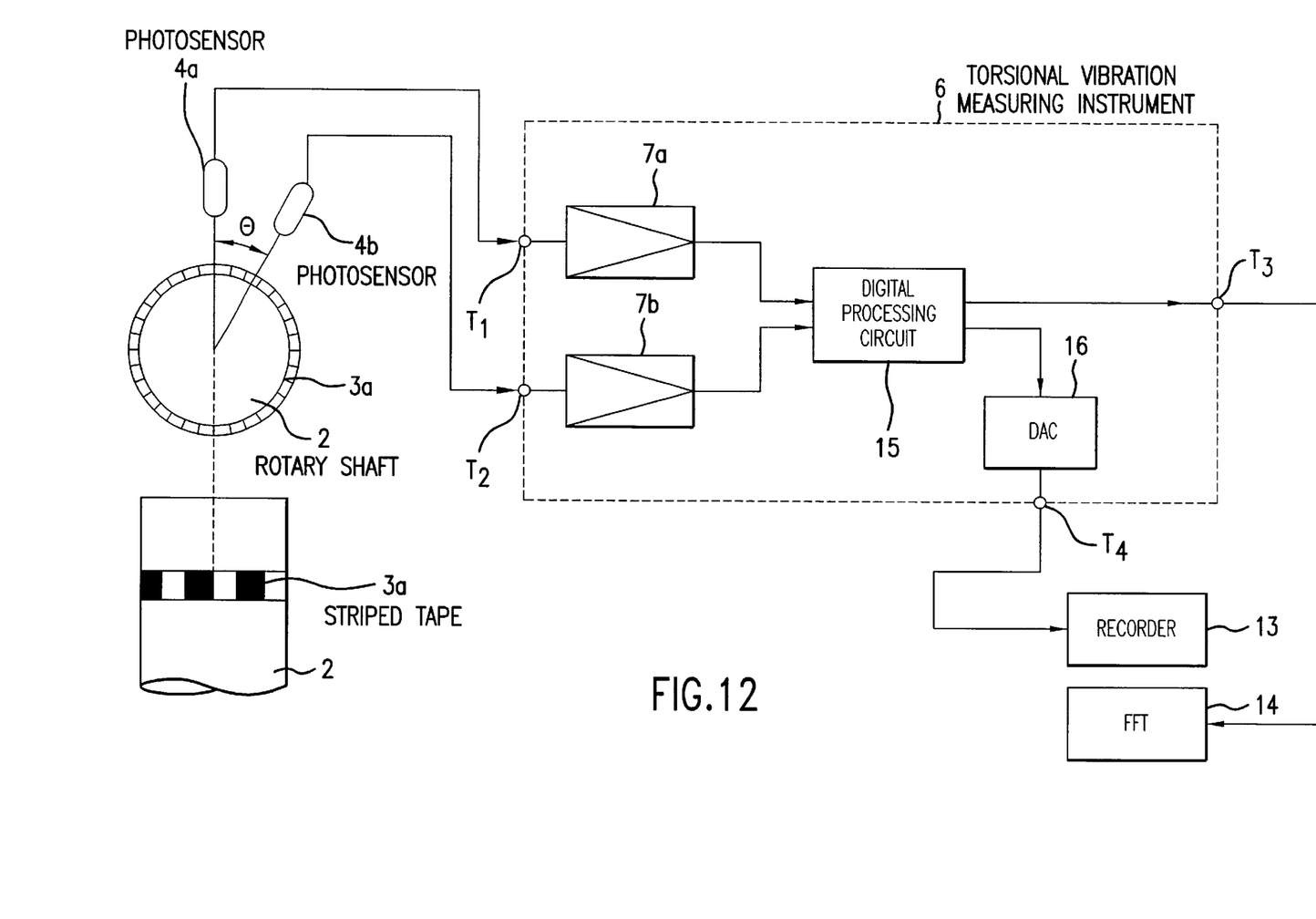
FIG. 12 is another operational diagram of a conventional torsional vibration measuring instrument.

The torsional vibration measuring instrument disclosed in Japanese Laid Open Gazette No. Hei 6-307922, as shown in FIG. 12, is perfectly digitized so as to free its measuring range from the capacities of circuits. In FIG. 12, the components coinciding with those in FIG. 11 are marked by the same reference numerals without description. Furthermore, a striped tape 3a is stuck to the periphery of rotary shaft 2, and a pair of photosensors 4a and 4b such as photodiodes are disposed at a reference angle θ from a surface which is perpendicular to the longitudinal direction of rotary shaft 2 and opposite to tape 3a.

The rotation pulses output from photosensors 4a and 4b pass through input terminals $T_1$ and $T_2$ and first and second amplifiers 7a and 7b, respectively, so as to be inputted into a digital processing circuit 15 in torsional vibration measuring instrument 6. Digital processing circuit 15 comprises a period calculating unit, a sample period measuring unit, a sum averaging unit, a rotation angle displacement fluctuation calculating unit and the like, so as to send a calculated signal Δθ of fluctuation of rotation angle displacement of rotary shaft 2 to first output terminal $T_3$. Various pulse shapes are analyzed from fluctuation signal Δθ by FFT analyzer 14 or the like which is connected with first output terminal $T_3$. Furthermore, fluctuation signal Δθ is sent to a second output terminal $T_4$ through a digital-analog convertor (DAC) 16, so as to be recorded by recorder 13 connected to second output terminal $T_4$. This torsional vibration measuring instrument can reliably detect the seam on tape 3a by timers of photosensors 4a and 4b.

The above-said conventional digitalized torsional vibration measuring instrument has involved the problem that a distance between opposed photosensors 4a and 4b above tape 3a must be smaller than the pitch of each stripe on tape 3a, thereby requiring a long time for the burdensome arrangement of photosensors 4a and 4b and making the instrument expensive.

Furthermore, the same instrument has been of an installed type requiring a large casing. When the torsional vibration measurement is to be performed at a worksite in a factory or the like, recorder 13 and FFT analyzer 14 must be carried together with such a large instrument.

SUMMARY OF THE INVENTION

The present invention provides a torsional vibration measuring instrument and a torsional vibration measuring method for solving the above problems. A first object of the invention is to obtain a miniaturized portable torsional vibration measuring instrument, which can be placed in a narrow space of a ship, a power plant or the like, memorize the torsional vibration data fast with reliability and display the memorized data, and to obtain a method for such measurement by use of the instrument.

A second object of the invention is to obtain a torsional vibration measuring instrument including a striped tape stuck onto a rotary shaft and a torsional vibration measuring method, wherein, when the rotational period between juxtaposed stripes of the tape across a seam thereon is different from that between regularly juxtaposed stripes thereof (when the fluctuation of rotational angle displacement between the juxtaposed stripes across the seam is large), the different period across the seam is replaced with the average of the forward and rearward periods, thereby avoiding difficult adjustment of the seam and the detection jump across the seam.

The torsional vibration measuring instrument of the present invention comprises a detection means for detecting a period every a predetermined angle during one rotation of a rotated object, a storage means for recording the period detected by the detection means, an average calculation means for calculating an average of the detected period, a torsional angle calculation means for calculating a torsional angle of the rotated object from the average calculated by the average calculation means and from the period detected by the detection means, and a display means for displaying at least the amplitude of torsional angle.

The torsional vibration measuring method of the present invention is to remove the storage means which has recorded the value detected by the detection means, from the portable torsional vibration measuring instrument with the display means, and attach the storage means to a data analyzing/processing means, thereby enabling the data analyzing/processing means to print out the analyzed data or communicate the data signal.

BEST MODE FOR CARRYING OUT THE INVENTION

An explanation will be given on a torsional vibration measuring instrument and a torsional vibration measuring method in accordance with FIGS. 1 to 10.

Figure 1:
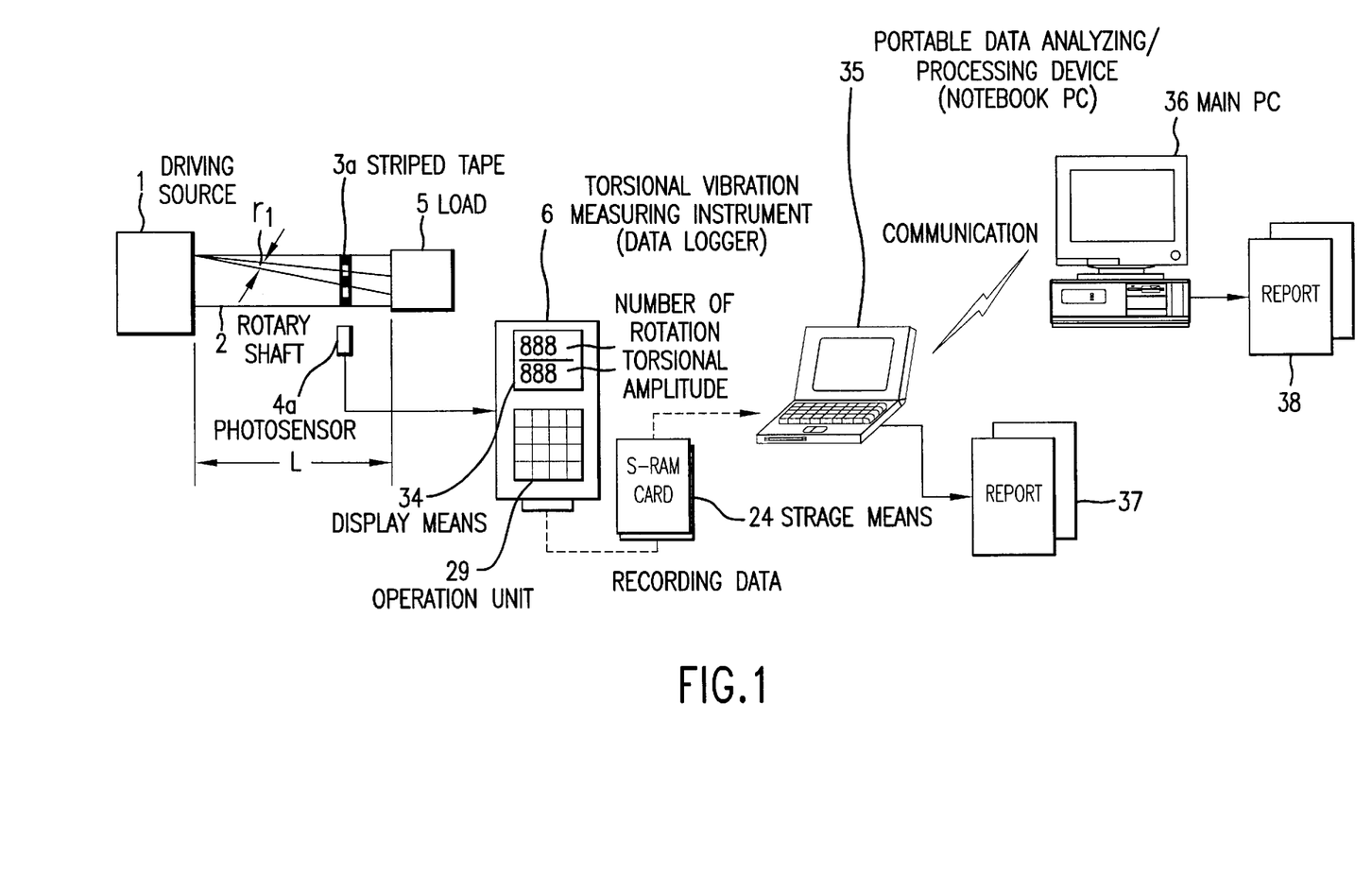
FIG. 1 is an operational diagram of a torsional vibration measuring method by use of a torsional vibration measuring instrument according to the present invention.

FIG. 1 illustrates the torsional vibration measuring method by use of the torsional vibration measuring instrument according to the present invention. A driving source 1 like a diesel engine delivers rotational force to a rotary shaft 2. A piston or pistons repeat suction, compression, expansion and exhaust processes thereof in a cylinder or cylinders of driving source 1. Except during the expansion process caused by explosion, rotary shaft 2 receives force corresponding to a load 5 against the rotational force given by driving source 1, so that a torsional moment works on rotary shaft 2. In order to measure a shearing strain $\gamma_1$ on the surface of rotary shaft 2, a striped tape 3a which has white and black stripes in alternate order is stuck onto a predetermined portion, e.g. a midway, of rotary shaft 2 of a length L. Photosensor 4a, like a photo diode, detects light reflected from the tape 3a, so that rotation pulse lines are supplied into a portable torsion vibration measuring instrument (hereinafter, data logger) 6. It will be appreciated that, if rotary shaft 2 is provided with a gear 3, an electromagnetic pickup 4 may be disposed to face to teeth of gear 3, as shown in FIG. 11.

Data logger 6, comprising a miniaturized casing, logs the rotation pulse line into intermittent ones every predetermined number of rotations of rotary shaft 2. Data logger 6 has a display means 34, like an LCD, which can display at least the rotational speed and the torsional amplitude, and an operation unit 29 with a numeric keypad and the like. Additionally, data logger 6 has a storage means 24, like an S-RAM card or a memory flush, which can be removed from the casing.

Storage means 24 which has recorded data from data logger 6 can be attached to a portable data analyzing/processing device (hereinafter, notebook PC) 35, so that, when a printer or the like is connected with notebook PC 35, the result of analysis in a worksite can be printed out. RS-232C or the like which has been conventionally used is not used for connection between storage means 24 and notebook PC 35, thereby transmitting the data therebetween quickly. Only several exchanges of storage means 24 are required to store data in volume. Notebook PC 35 has software for analyzing the strain and the torsional angle in relation to the rotational speed, the torsional angle in relation to the number of rotation (or to the frequency) and in relation to the crankshaft angle. The analysis result can be printed out as a report 37.

Additionally, data can be communicated from notebook PC 35 to a data analyzing/processing device (hereinafter, main PC) 36 placed in a remote factory, design office or the like by telephone line or satellite, so that the data recorded at the worksite can be analyzed at such a remote site rapidly and the results thereof, such as a report 38, can be printed out in real time.

Figure 2:
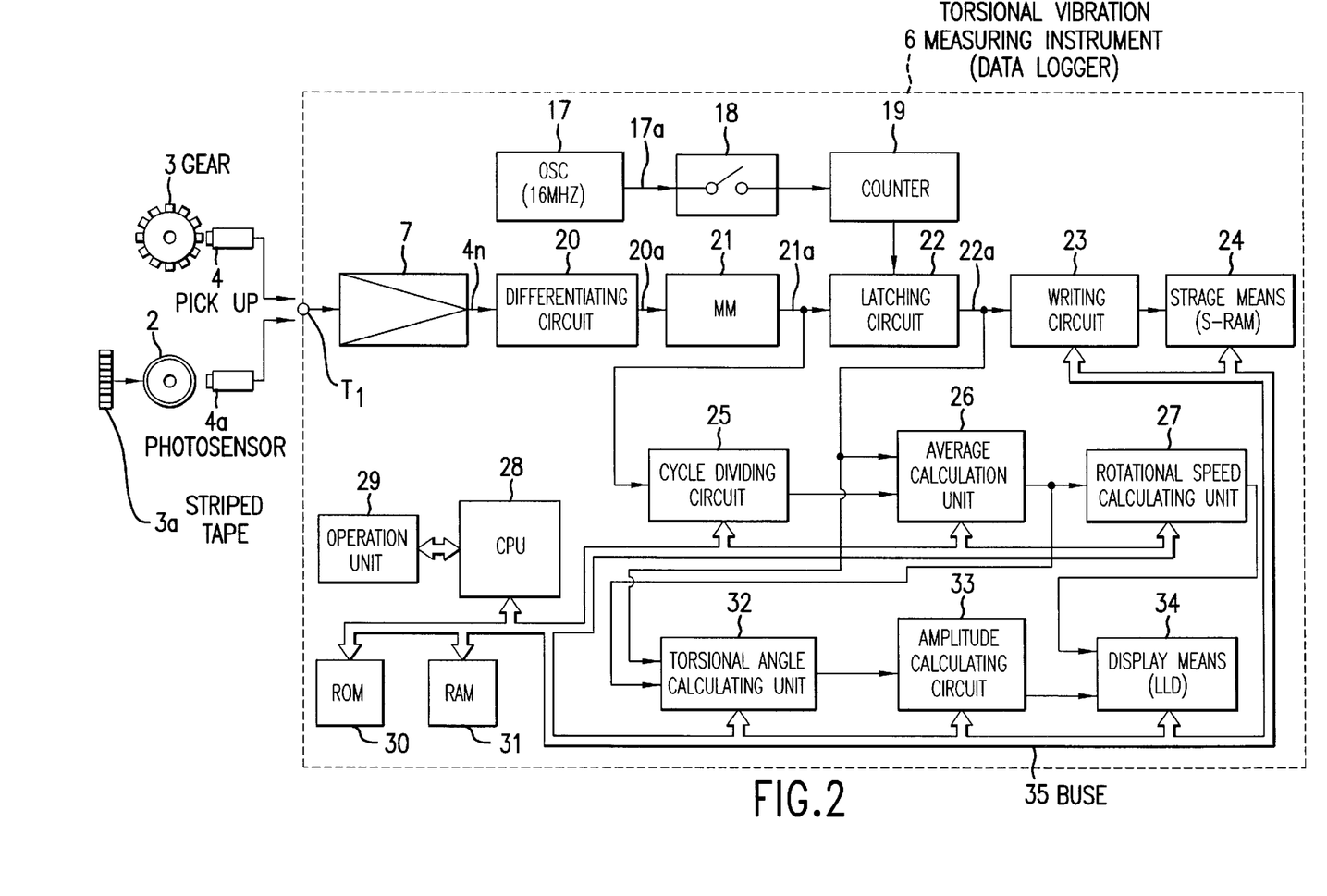
FIG. 2 is a flow diagram of the torsional vibration measuring instrument according to the present invention.

Referring to FIG. 2 showing a flow diagram of data logger 6 according to the present invention, either pickup 4 and gear 3 or striped tape 3a and photosensor 4a are provided as an encoder. The rotation pulse lines picked up by such detection means are sent into input terminal $T_1$ of data logger 6 as shown in FIG. 3B.

Input terminal $T_1$ is connected to amplifier 7. The signal output from amplifier 7 is transmitted into a latching circuit 22 and a cycle dividing circuit 25 via a differentiating circuit 20 and a mono-stable multi vibrator (hereinafter, MM) 21.

Figure 3:
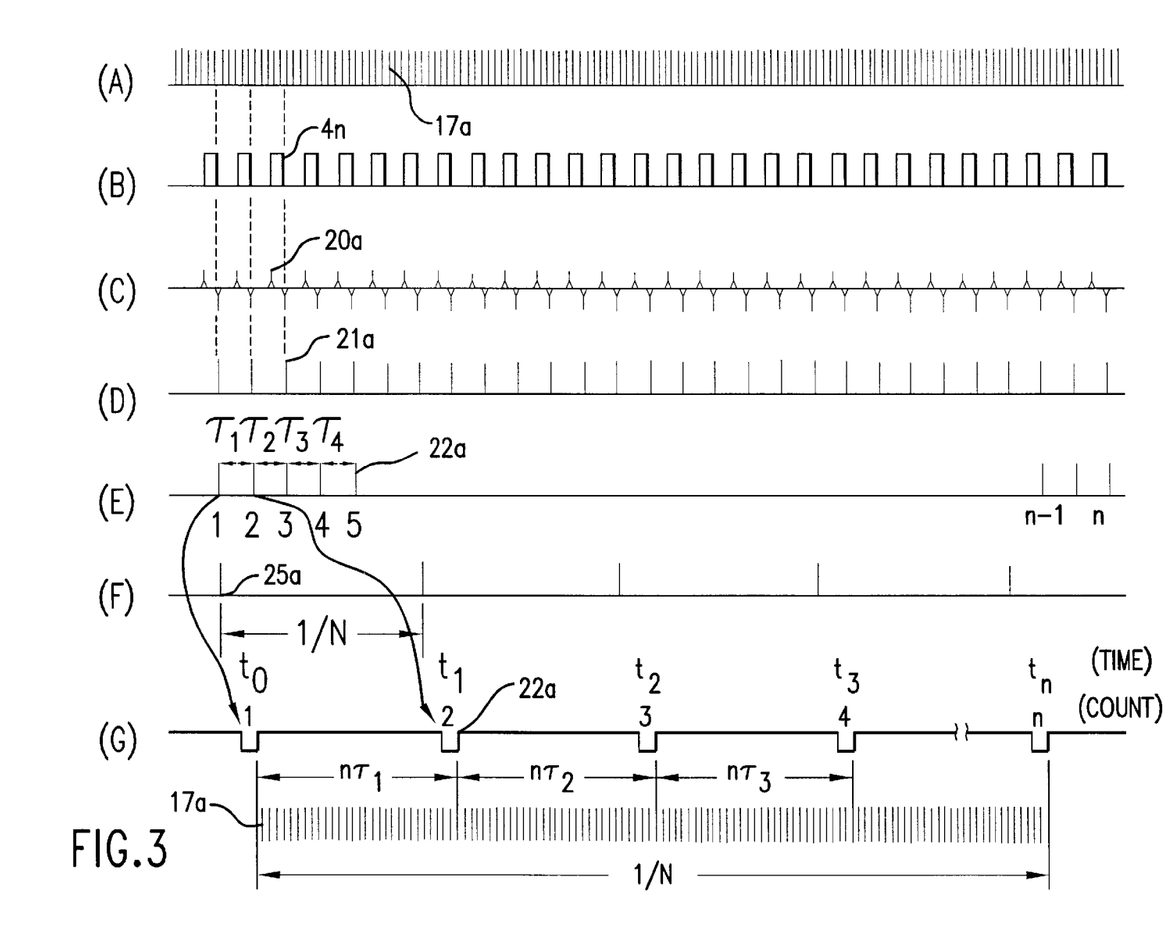
FIG. 3 are wave form charts by the torsional vibration measuring instrument according to the present invention.

A clock oscillator 17 generates a clock signal 17a consisting of reference pulses at a predetermined frequency, e.g., of 16 MHz as shown in FIG. 3A. Clock signal 17a is received by a counter 19 via a count starting switch 18, when being closed, in operation unit 29, so that counter 19 freely runs to start counting. The count signals from counter 19 are supplied into latching circuit 22.

Latching circuit 22 latches the counts from counter 19 every pulse line from the encoder, and storage means 24 records the latched data via writing circuit 23.

Both of the data from latching circuit 22 and from cycle dividing circuit 25 are supplied into average calculating unit 26 so as to calculate an average of periods corresponding to the pulse lines during one rotation, in other words, a time for one rotation.

The average data calculated by average calculating unit 26 is supplied into a rotational speed calculating unit 27 and a torsion angle calculating unit 32.

Rotational speed calculating unit 27 calculates the rotational speed every period during one rotation, and each resulting rotational speed is displayed by display means 34.

In addition to the resulting data from average calculating circuit 26, torsional angle calculating unit 32 is also provided with the latched data from latch circuit 22, so as to calculate a torsional angle.

The torsional angle data from torsional angle calculating circuit 32 is supplied into an amplitude calculating unit 33, so as to calculate the difference between the reference rotational angle and the measured rotational angle, whereby the data of difference between the maximum and minimum every rotation of rotary shaft 2 is outputted so as to be displayed as a value of torsional amplitude by display means 34.

A microcomputer (hereinafter, CPU) 28 is provided with conventional ROM (read only memory) 30 and RAM (random access memory) 31 and with operation unit 29 including the numeric keypad and the like. CPU 28 interchanges data through buses 35 with writing circuit 23, storage means 24, cycle dividing circuit 25, average calculating circuit 26, rotational speed calculating circuit 27, torsional angle calculating circuit 32, amplitude calculating circuit 33, display means 34 and the like and controls them for calculation by the circuits or the means or writing data on storage means 24.

The operational process of data logger 6 in the above construction will be described as follows in accordance with FIG. 3 illustrating the wave shape charts thereof.

Detected pulses 4n which are detected by electromagnetic pickup 4 or photosensor 4a of the encoder are amplified by amplifier 7 as shown in FIG. 3B, and are differentiated at their rising and trailing edges by differentiating circuit 20 as shown in FIG. 3C. Next, MM 21 is triggered by the differentiated pulses from, e.g. the trailing edges of the detected pulses 4n, so as to provide short pulse lines 21a serving as short timing signals corresponding to respective detected pulses 4n.

Timing signals 21a are supplied to latching circuit 22. Clock signals 17a illustrated by FIG. 3A are counted by counter 19 simultaneously with the closing of starting switch 18. The counts 17a by counter 19 are latched by latching circuit 22 every timing signal and the number of the counts 17a is recorded by storage means 24 like S-RAM via writing circuit 23. In other words, values of counts each of which corresponds to each of periods $\tau_1$ to $\tau_n$, between adjacent timing pulses, as shown in FIG. 3E, are stored in storage means 24.

Cycle dividing circuit 25 delimits timing signals 21a from MM 21 every number N corresponding to one rotation of rotary shaft 2, so as to output dividing signals 25a every number N of timing pulses 21a, as shown in FIG. 3F. The number N is that of the same colored stripes of tape 3a or of teeth of gear 3.

Both counts 22a latched by latching circuit 22 and dividing signal 25a output from cycle dividing circuit 25 are transmitted into average calculating circuit 26. Average calculating circuit 26 sums the total of dividing signals 25a $n\tau_1$ to $n\tau_n$ every dividing signal 25a and divides the total by number N, so as to calculate an average A of counts every rotational period $\tau_n$. The calculation is performed by CPU 28 on the basis of data through average calculating circuit 26. This is given by the next expression (1):

$$A=(n\tau_1+n\tau_2+n\tau_3 \ldots +n\tau_n)/N \quad (1)$$

Thus, the average of clock-counts counted every period during one rotation of rotary shaft 2 is calculated. If the rotational speed of rotary shaft 2 is constant, the counts increases in proportion to the length of time $t_1, t_2, \ldots t_n$ corresponding to one rotation.

The resulting data of average calculating circuit 26 is transmitted into rotational speed calculating circuit 27, and CPU 28 calculates an average rotational speed (r.p.m.) corresponding to one period, i.e. one rotation/N by the expression 60/period.

Next, torsional angle calculating circuit 32 calculates a torsional angle from average A output from average calculating circuit 26 and real pulse lines latched every period of $\tau_1$ to $\tau_n$ by latching circuit 22, in other words, count values $n\tau_1$ to $n\tau_n$. Torsional angle θ is equal to average A subtracted from an ideal count value corresponding to the predetermined rotational angle.

Amplitude calculating circuit 33 calculates a fluctuation of torsional angle displacement Δθ from an ideal angle 1/N, e.g., of a rotation of rotary shaft 2 and from real torsional angle θ calculated by torsional angle calculating circuit 32 and outputs the difference between the maximum value and the minimum value every rotation as an amplitude value, which is displayed together with a rotational speed (r.p.m.) by display means 34 of data logger 6.

Figure 4A:
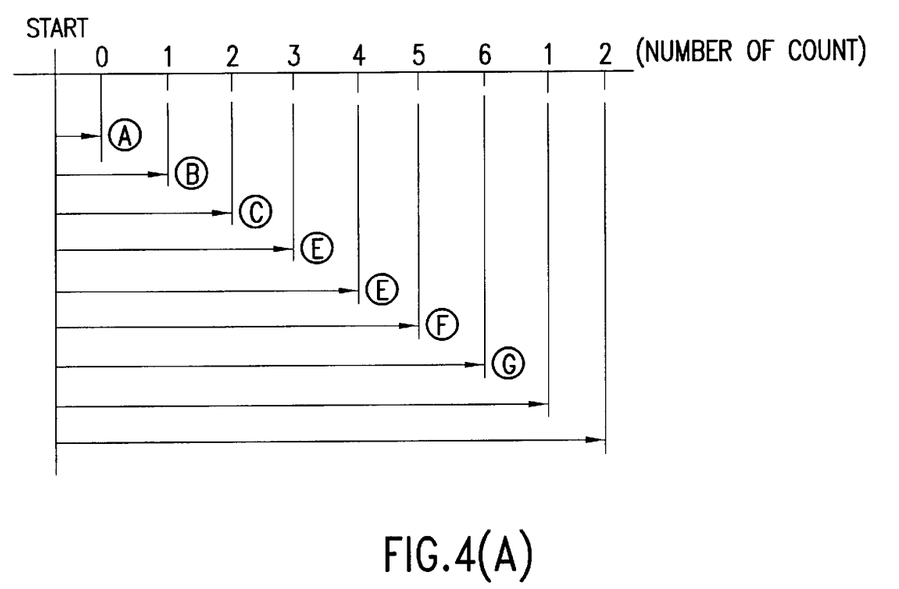
FIG. 4 are diagrams showing a relationship between the number (value) of counts and the rotational angle according to the present invention.
Figure 4B:
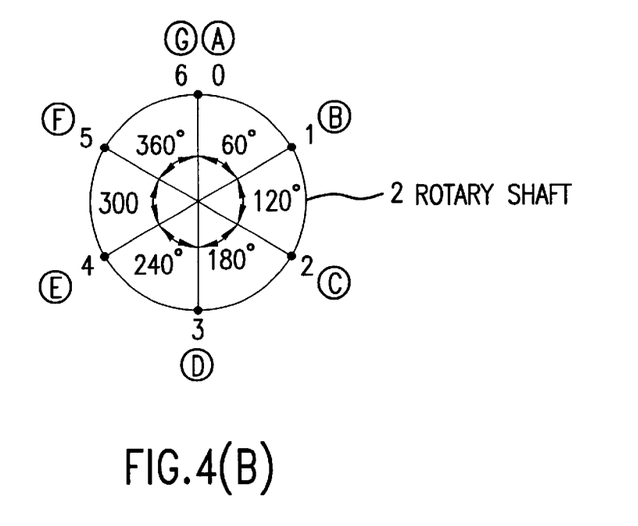

If the rotational speed of rotary shaft 2 or the average thereof is constant, it is increased in proportion to the number of counts, so that the angle may be represented as the value of counts. When rotary shaft 2 is provided with a 6-pulse sensor, which generates six detection pulses every rotation of rotary shaft 2, the torsional angle corresponding to one rotation of rotary shaft 2 is a count value $I_x(=(G)-(A))$ corresponding to one rotation of rotary shaft 2, as shown in FIGS. 4A and 4B. Each of count values (A) to (G) corresponds to each of count numbers 0 to 6, as shown in FIG. 4B, so as to define each of angles 0°, 60°, 120°, 180°, 240°, 300°, and 360° The ideal count value corresponding to each rotational speed is given by following expressions, wherein $I_x$ is proportionally divided:

$$(A)=I_x*0/360$$

$$(B)=I_x*60/360$$

$$(C)=I_x*120/360$$

$$(D)=I_x*180/360$$

$$(E)=I_x*240/360$$

$$(F)=I_x*300/360$$

$$(G)=I_x*360/360$$

Thus, torsional angle θ is calculated by the next expression:

$$\theta=\text{ideal count value}-\text{real count value}$$

The amplitude of torsional angle displacement and the rotational speed can be displayed by data logger 6 so that a judgement as to whether it is right or not can be made while measuring in a worksite, thereby solving the problem caused by the conventional measurement employing a remote FFT analyzer that it occasionally happens that a datum found to be unstored after analysis by the FFT analyzer must be restored in the worksite.

Furthermore, storage means 24, like S-RAM, is removably attached to data logger 6 for recording the data about the measured rotational speed and torsional angle, and the frequency analysis or the like is performed by portable notebook PC 35 separated from data logger 6, thereby minimizing data logger 6, so that the data can be reliably recorded in a narrow place like that in a ship for a limited short time. The data produced by data logger 6 can be transferred to a design department in a factory or the like in real time, or be recorded by storage means 24 to be checked afterward. Data logger 6 has such various advantages.

Detailed description will be given on the process to apply striped tape 3a onto rotary shaft 2 in accordance with FIGS. 5A, 5B and 5C and FIGS. 6A and 6B.

Conventionally, in the case that the pitch of each of a white stripe and a black stripe of tape 3a is P mm (like that shown in FIG. 5A), tape 3a must have been provided around rotary shaft 2 so that the stripe thereof which is the closest to a seam is more than P/2 mm for improving the accuracy of measurement. Such restriction requiring the seam adjustment taking a long time, while diameters of rotary shafts 2 are different from one another, has complicated the work for sticking striped tape 3a to rotary shaft 2. Furthermore, before the rotational speed and torsional angle measurement by data logger 6, the number of stripes of tape 3a stuck onto each rotary shaft 2 must be visually counted and input into data logger 6.

Figure 5A:
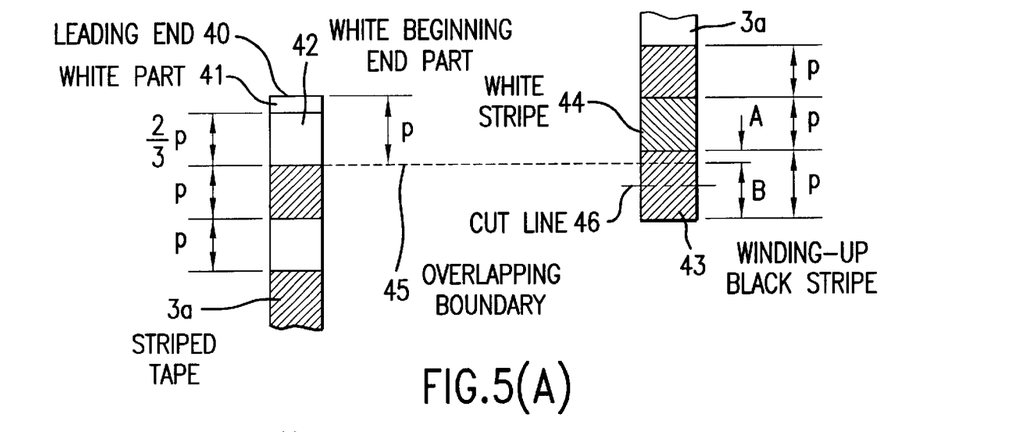
FIG. 5 are diagrams showing some marking processes of striped tapes.
Figure 5B:
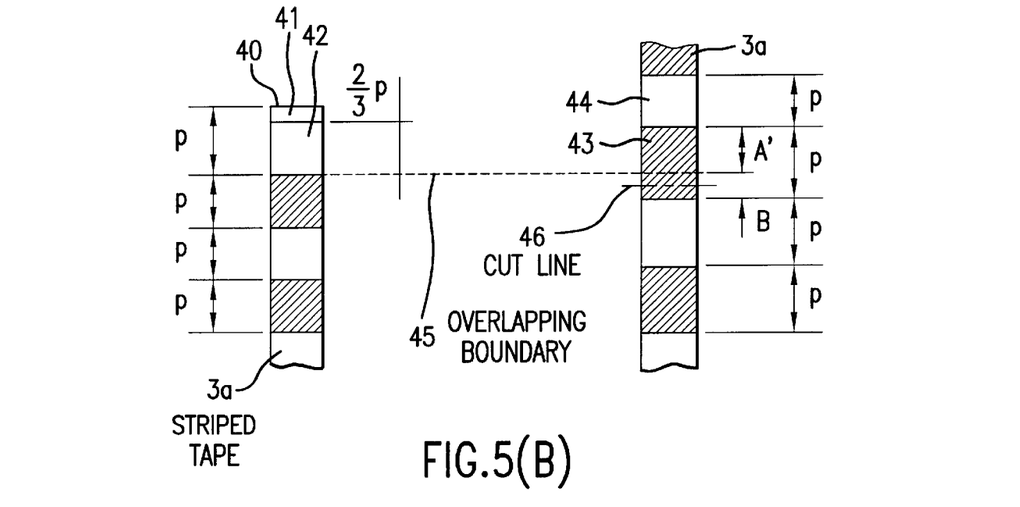
Figure 5C:
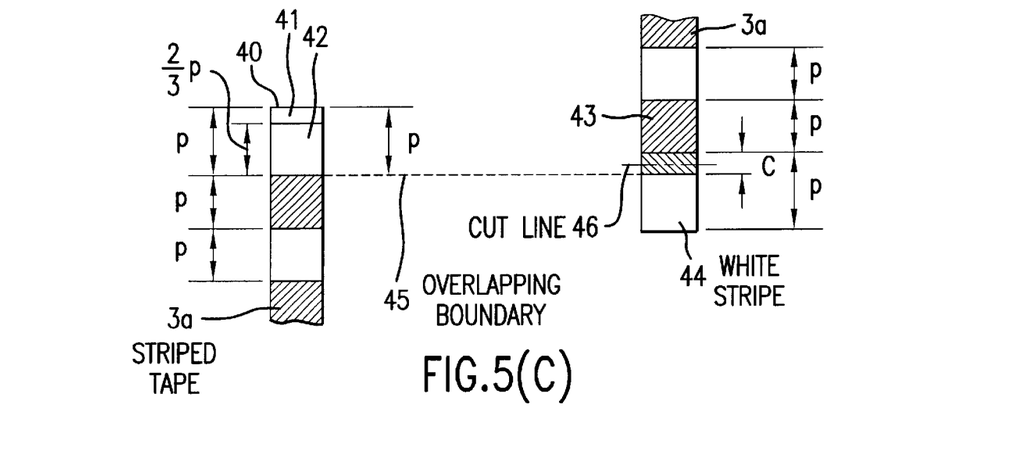

The preferred embodiment is provided to enable striped tape 3a to be stuck to rotary shaft 2 regardless of the diameter of rotary shaft 2 to be measured so as to avoid the above complicated work at a worksite. Tape 3a is painted with the same color, black, across the seam thereof, thereby extending the black stripe including the seam, so that data logger 6 can read the extended black stripe without visual counting so as to calculate the torsional angle and the rotational speed.

As shown in FIGS. 5A to C, when each of white and black stripes has a pitch of P mm, the white stripe which is the closest to the seam is filled in with black by a pen or the like, so as to create a recognizably extended black stripe across the seam with a pitch between 1.5P mm to 3.5 P mm which is different from the pitches of any other black stripes.

In this regard, when applying the tape 3a to rotary shaft 2, as shown in FIG. 5A, a white part 41 is cut away from a leading end 40 so that the remaining white stripe is a beginning end part 43 to be stuck and has a pitch of 2 P/3 mm. Tape 3a is wound around rotary shaft 2 once. Then, if a boundary 45 between white beginning end part 42 and a juxtaposed black stripe overlaps with a winding-up black stripe 43 so as to be apart from a boundary between winding-up black stripe 43 and a white stripe 44 immediately before winding-up black stripe 43 with a pitch A between 0 mm and P/2 mm, white stripe 44 is filled in with black. Winding-up black stripe 43 is cut along a cut line 46 as a seam within its part of a pitch B between overlapping boundary 45 and the last end of winding-up black stripe 43. The resulting extended last black stripe has a pitch between 3 P mm and 3.5 P mm.

As shown in FIG. 5B, if boundary 45 of tape 3a once wound around rotary shaft 2 overlapping with winding-up black stripe 43 is apart from a boundary between winding-up black stripe 43 and a white stripe 44 immediately before winding-up black stripe 43 with a pitch A' between P/2 mm and P mm, white stripe 44 is left as it is while winding-up black stripe 43 is cut along cut line 46 as a seam within its part of pitch B between overlapping boundary 45 and the last end of winding-up black stripe 43. The resulting extended last black stripe has a pitch between 1.5 P mm and 2.0 P mm.

As shown in FIG. 5C, if the winding-up of tape 3a once wound around rotary shaft 2 is in white stripe 44 so that boundary 45 overlaps with windingup white stripe 44, a part C of winding-up white stripe 44 between overlapping boundary 45 and the last end of black stripe 43 just before winding-up white stripe 44 is filled in with black and is intermediately cut along cut line 46 as a seam. The resulting extended last black stripe has a pitch between 2.0 P mm and 3.0 P mm.

Thus, winding-up black stripe is extended between 1.5 P mm and 3.5 P mm (150 and 350) corresponding to the above some different situations of tape 3a wound around rotary shaft 2.

For the purpose that the number of the same colored stripes of tape 3a every rotation of rotary shaft 2 can be not visually, but automatically counted, conventionally, wound tape 3a must have had one colored stripe which generates one pulse. According to the preferred embodiment, as shown in FIG. 6A, CPU 28 in data logger 6 can count the number of several pulses caused by one rotation of rotary shaft 2 with tape 3a having the several same colored stripes.

Figure 6A:
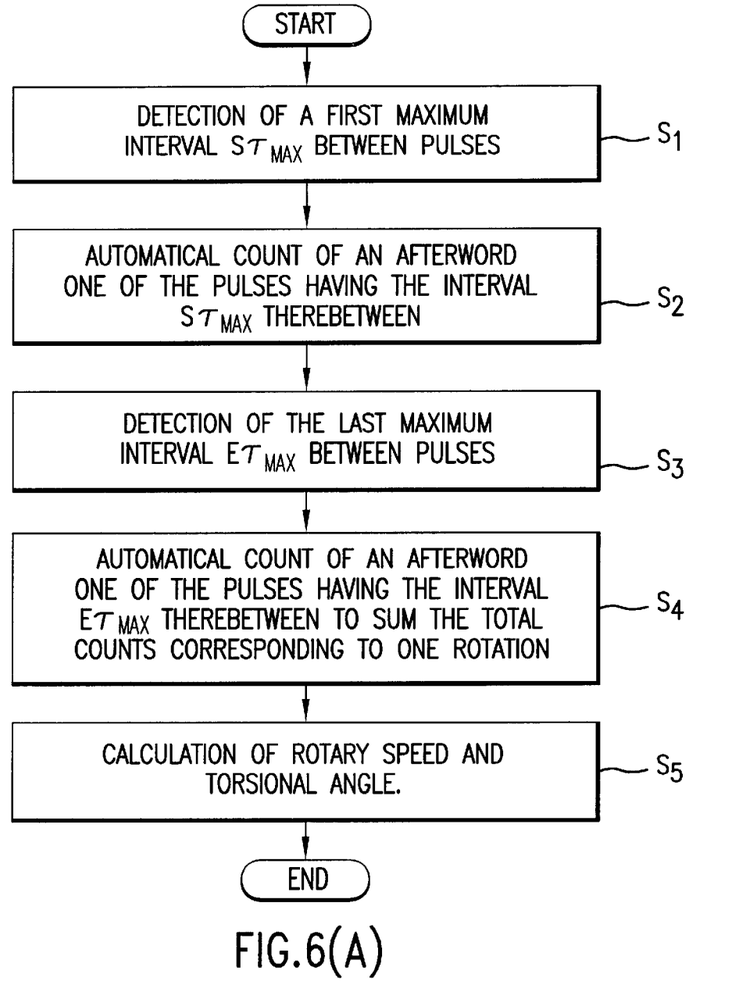
FIG. 6 are a flow sheet and a diagram showing a process of counting pulses during one rotation of the tape.
Figure 6B:
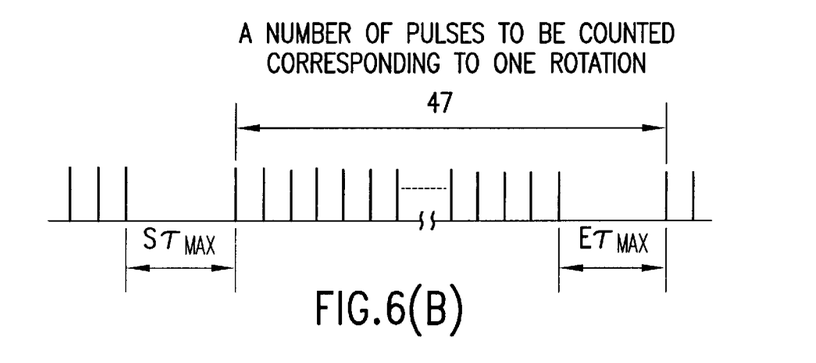

Referring to FIG. 6A, at a first step $S_1$, CPU 28 detects the first maximum interval $S\tau_{MAX}$ immediately before the aforemost pulse (as shown in FIG. 6B), which is caused by extended black stripe 43 including the seam.

At a second step $S_2$, after detection of the first maximum interval $S\tau_{MAX}$, following pulses are automatically counted one by one during one rotation of rotary shaft 2.

At a third step $S_3$, the last maximum interval $E\tau_{MAX}$ (as shown in FIG. 6B) is detected. At a fourth step $S_4$, the pulse next to the last maximum interval $E\tau_{MAX}$ is counted, and is added to the above counts of pulses, thereby summing a total of pulses 47 during one rotation of rotary shaft 2.

At a fifth step $S_5$, the rotational speed and the torsional angle are calculated as detailed in FIG. 2, on the basis of the total number of pulses.

Explanation will now be given on another construction for recording data of torsional amplitude according to the present invention. In such a case that several rotational speeds of an engine for recording the data are determined while the engine is gradually accelerated, the tables corresponding to the respective determined rotational speeds have been previously recorded in RAM 31 or storage means 24 for CPU 28, and then the datum is recorded by storage means on every the rotational speed. However, since the acceleration of the engine is manually operated, it may happen that the acceleration is too fast to record the datum on the moment that the rotational speed reaches the predetermined.

Conventionally, such an unrecorded datum has not been able to be recognized before the data analysis by the FFT analyzer or the like, so that data logger 6 has had to be taken again to the vicinity of the engine for recording the unrecorded datum. To avoid the problem, data logger 6 of the preferred embodiment can display the rotational speed of the engine where the datum is unrecorded immediately after the data record.

Figure 7:
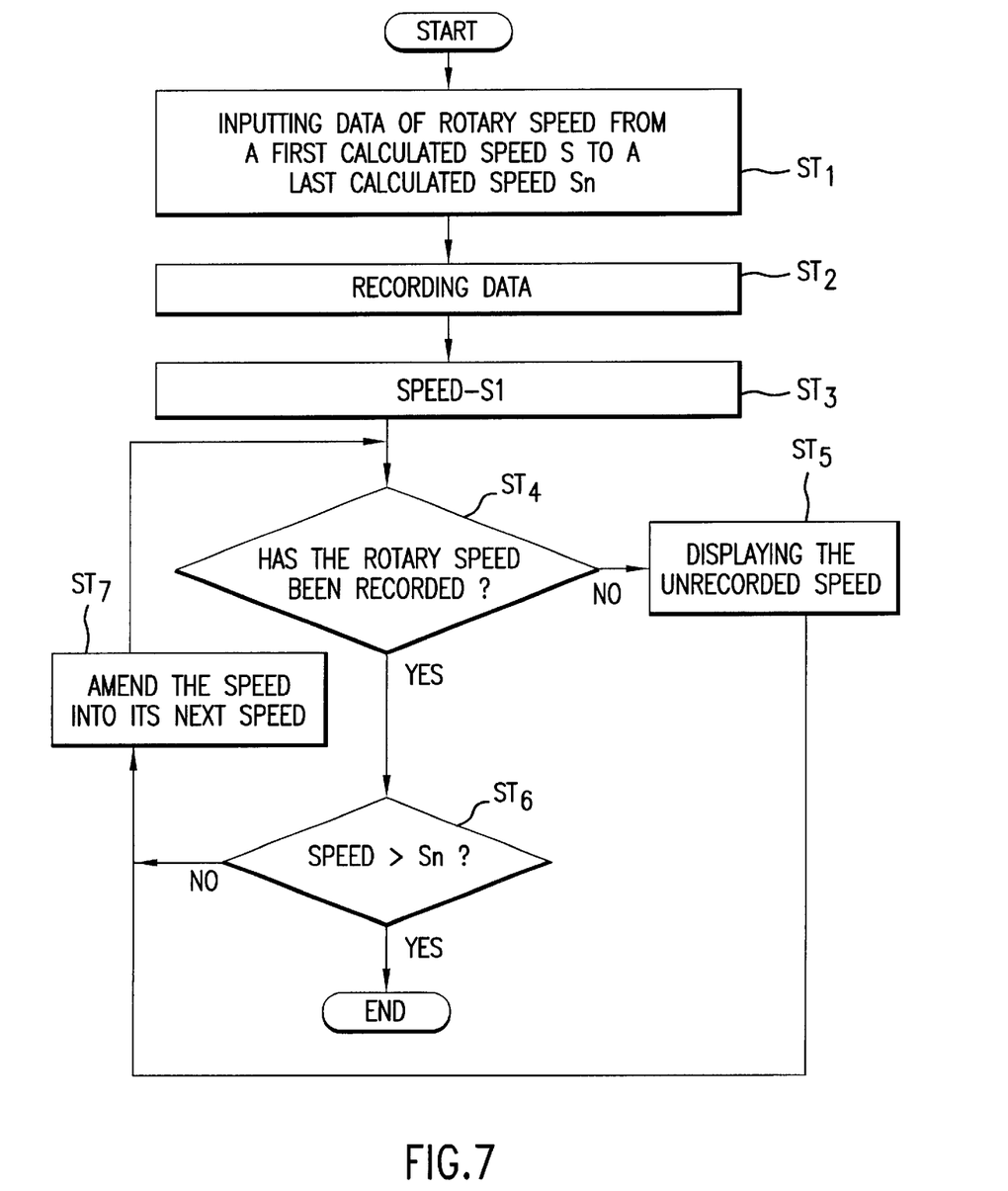
FIG. 7 is a flow sheet of a data storage process including a routine for unrecorded data according to the present invention.

FIG. 7 illustrates a flow chart of a process by CPU 28 when there is such an unrecorded datum.

At a first step $ST_1$, each datum is input into the CPU corresponding to each of rotational speeds between a first speed $S_1$ (min. r.p.m.) and a last speed $S_n$ (Max. r.p.m.), which are determined by the table in storage means 24.

At a second step $ST_2$, data recording starts, and when the rotational speed of rotary shaft 2 reaches first speed $S_1$, a datum is recorded in correspondence to first rotational speed $S_1$ according to a third step $S_3$.

At a fourth step $ST_3$, CPU 28 checks whether there has been recorded the datum or not. When there is no recorded datum, the rotational speed is displayed by display means 34 according to a fifth step $ST_5$. At a seventh step $ST_7$, the rotational speed is increased to the next determined, and then the process is returned to fourth step $ST_4$.

If a datum is detected to be recorded at fourth step $ST_4$, the process is advanced to a sixth step $ST_6$, when there is decided whether it is the last step or not. In other words, the judgement whether the rotational speed is larger than last determined rotational speed $S_n$ or not. If it is so, the process reaches its end. If it is not, the rotational speed is increased to the next determined according to seventh step $ST_7$, so that the detection of recorded datum at fourth step $ST_4$ and the following steps $ST_{5\ to\ 8}$ are repeated.

According to the preferred embodiment, immediately after every data recording, display means 34 can display the rotational speed when the datum is unrecorded, so that the unrecorded datum can be recorded while data logger 6 remains in connection with the engine.

Figure 8A:
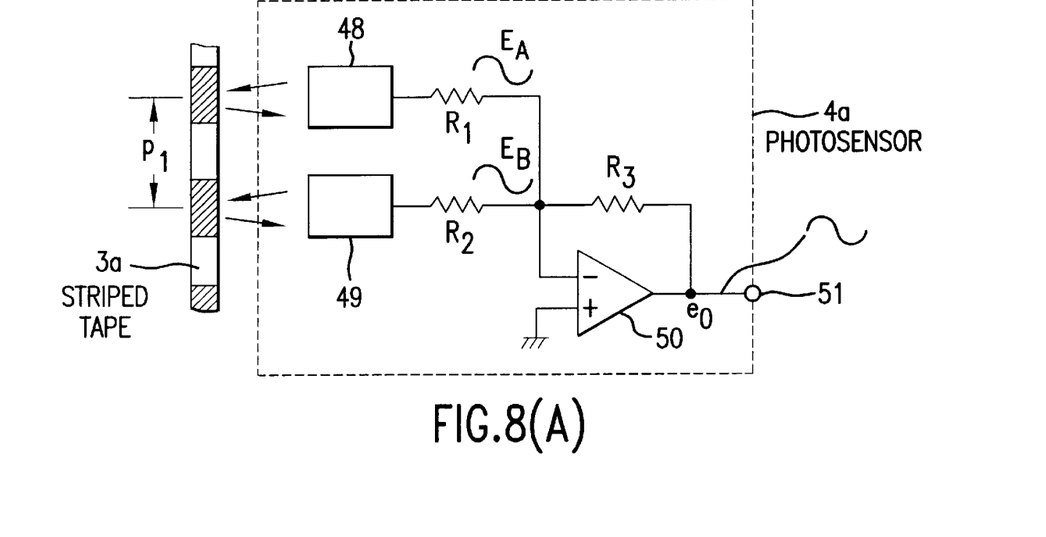
FIG. 8 are a schematic diagram of detection process by use of a plurality of sensors and graphs showing the effect thereof.

Referring to FIG. 2, single photosensor 4a or pickup 4 is opposed to striped tape 3a or gear 3. On the contrary, FIG. 8A shows that photosensor 4a has a plurality of sensor elements 48 and 49 made of photo couplers, photo interrupters or the like, which are disposed with a certain pitch P. therebetween corresponding to black stripes, e.g., of striped tape 3a. The outputs of sensor elements 48 and 49 are summed through respective resistances $R_1$ and $R_2$ so as to supplied to a reversing input terminal of a differential amplifier 50 while the non-reversing input terminal thereof is connected with the earth. A feedback resistance $R_3$ is interposed between an output terminal 51 and the reversing input terminal of differential amplifier 50. Resistance $R_3$ equals $R_1/2$ or $R_2/2$ both which are equal to each other, so that both outputs of sensor elements 48 and 49 are summed in the same phase excepting the difference of pitch $P_1$.

According to the above mentioned construction, the output voltage $-e_0$ of differential amplifier 50, on the assumption that the output voltages of sensor elements 48 and 49 are designated as $E_A$ and $E_B$, respectively, equals $E_A+E_B/2$. Thus, the output of differential amplifier 50 is averaged, thereby being accurate. Of course, the analogue wave shape obtained by output terminal 51 is changed into a pulse line through a wave shape forming circuit (not shown), so as to be supplied into input terminal $T_1$.

Figure 8B:
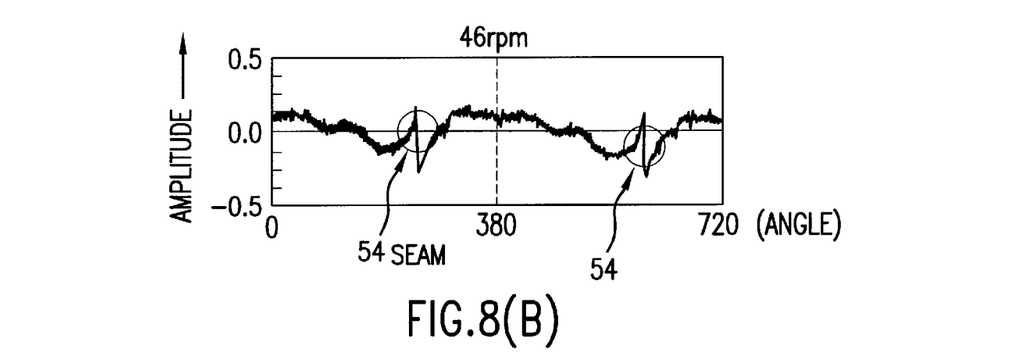
Figure 8C:
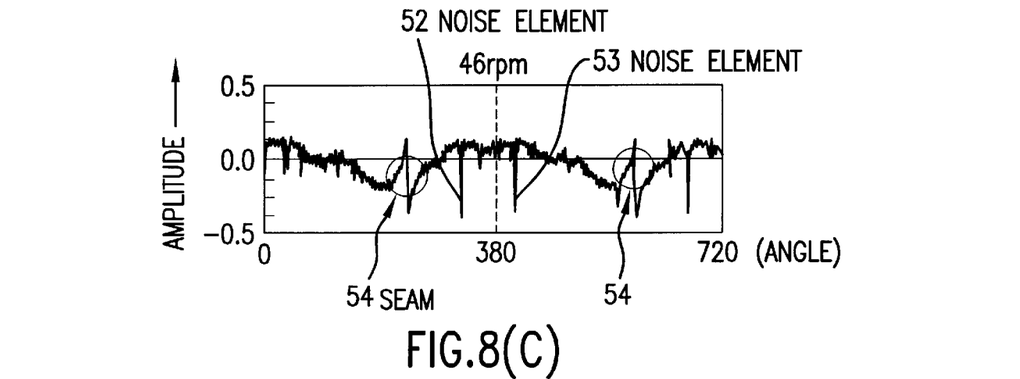

In the state that the rotational speed of rotary shaft 2 is 46 r.p.m., the data recording of the torsional amplitude in relation to the rotational angle when using two sensor elements as shown in FIG. 8B is perfectly prevented from any noise element, in comparison with that when using a single sensor element as shown in FIG. 8C which causes noise elements 52 and 53. A reference numeral 54 designates an element caused by the seam of striped tape 3a.

Next, detailed explanation will be given on a method for amendment of ones caused at the seam of tape 3a or the noisy position in the data recorded in storage means 24 like S-RAM by data logger 6, which are, for example, of fixed frequency to be analyzed by the FFT analyzer or the like.

Figure 9:
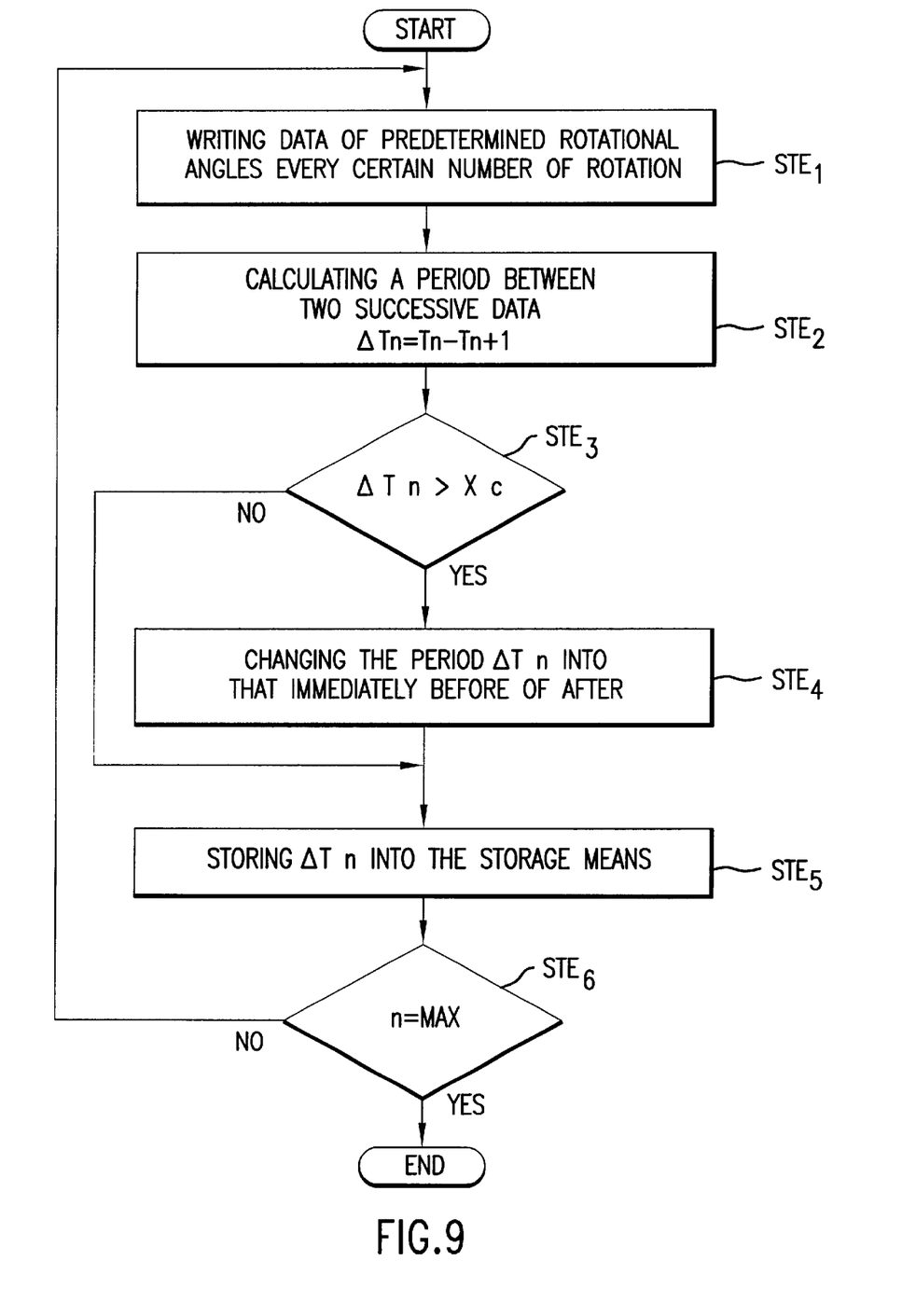
FIG. 9 is a flow sheet of a process for amending the detected signal across a seam of the striped tape;.

Referring to a flow chart in FIG. 9, a first step STE, is provided to read sample data each of which is a number N of total clock counts from the first count every rotational angle corresponding to a predetermined number of rotation (until e.g. a rotational angle of 5760° corresponding to 16 rotations).

At a second step $STE_2$, a period between a sampling time and a sampling time immediately before or after is calculated. In this regard, CPU 28 subtracts the sample count number from that immediately after so as to obtain a period datum $\Delta T_n(=T_{n+1}-T_n)$. Thus, period data $\Delta T_{n-1}(=T_n-T_{n-1})$ . $\Delta T_n(=T_{n+1}-T_n).\Delta T_{n+1}(=T_{n+2}-T_n)$ and so on are obtained.

At a third step $STE_3$, period datum $\Delta T_n$ is compared with a predetermined threshold $X_c$.

If $\Delta T_n$ is larger than $X_c$, a fourth step $STE_4$ is provided to replace sample datum $\Delta T_n$ with an average of both data $\Delta T_{n-1}$ and $\Delta T_{n-1}$ immediately before and after sample datum $\Delta T_n$(i.e. $\Delta T_n=(\Delta T_{n-1}+\Delta T_{n+1})/2$), and then a process is advanced to a fifth step $STE_5$.

If $\Delta T_n$ is not larger than $X_c$, a process is transferred to fifth step $STE_5$ beyond fourth step $STE_4$. At fifth step $STE_5$, datum $\Delta T_n$ is recorded again in storage means 24.

A sixth step $STE_6$ is provided to judge whether the sampling is the last or not. If it is so, the process reaches the end. If it is not, the process returns to first step $STE_1$ for next sampling.

The data recorded in storage means 24 of data logger 6 are clock data every detection pulse input, so that each period can be obtained by subtraction of each clock datum from that immediately after.

Figure 10A:
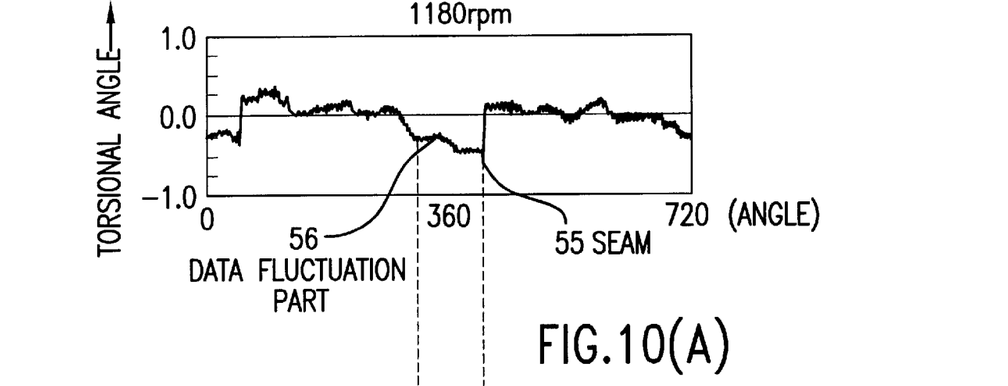
FIG. 10 are wave form charts in result from the process shown in FIG. 9.
Figure 10B:
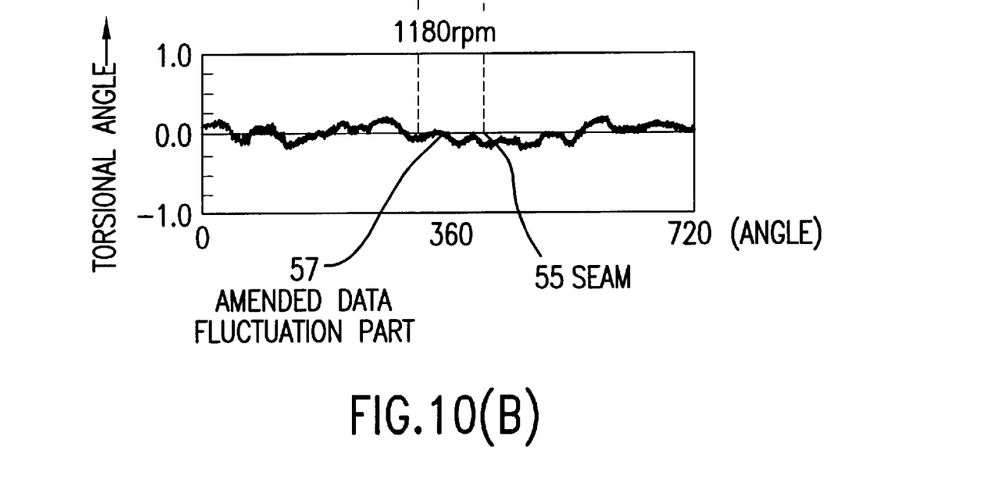

According to the preferred embodiment which can process with the above mentioned software, a data fluctuation part 56 where values of data vary across a seam 55 of tape 3a, as shown in FIG. 10A, can be amended into a part 57 as shown in FIG. 10B.

FIGS. 10A and 10B illustrate the measured torsional angle data in relation to the rotational angle (720°) of rotary shaft 2 corresponding to its 2 rotations in the condition that the rotational speed of rotary shaft 2 is 1180 r.p.m. FIG. 10A is of before the amendment, and FIG. 10B of after it. It will be noticed that the jump of torsional angle value through seam 55 shown in FIG. 10A is made to vanish as shown in FIG. 10B. Hence, according to such a data amending method as shown in FIG. 9, the torsion measurement can be prevented from mistake by the great fluctuation of data value caused by noise or the seam, and striped tape 3a can be wound and stuck onto rotary shaft 2 without complexity.

Threshold $X_c$ is so determined that, when a difference between one pulse period datum and the pulse period average is beyond that corresponding to theoretical torsional amplitude, the pulse period datum is amended to the average of those immediately before and after the datum.

Figure 10C:
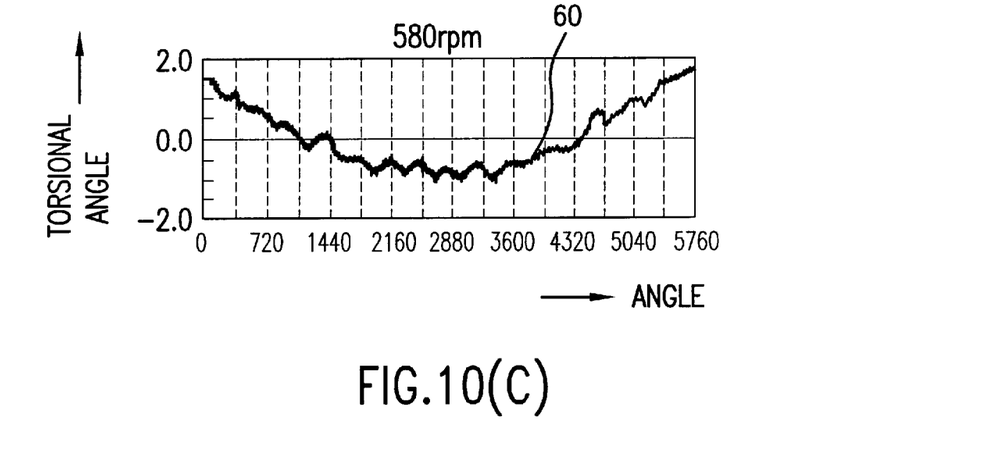
Figure 10D:
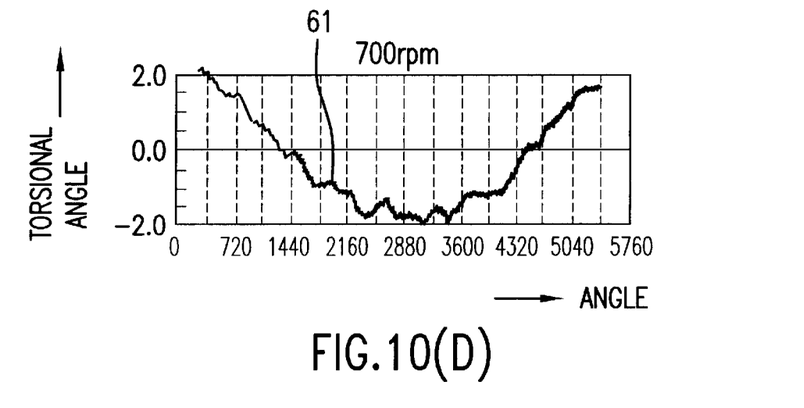
Figure 10E:
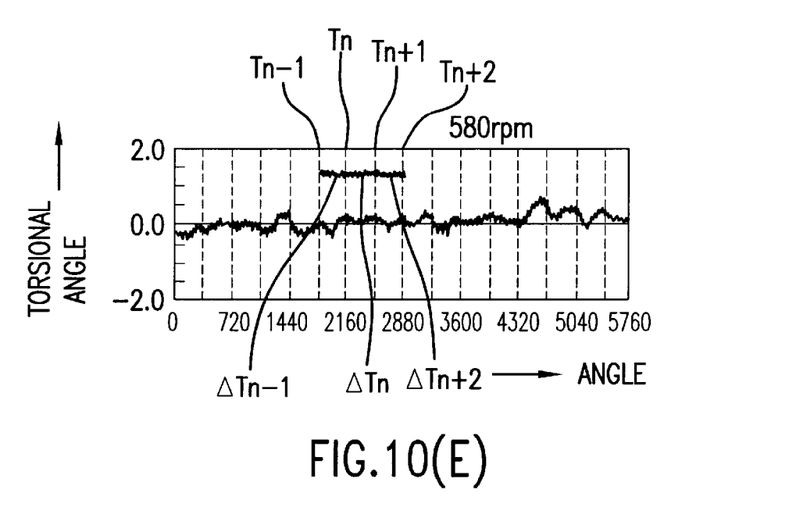
Figure 10F:
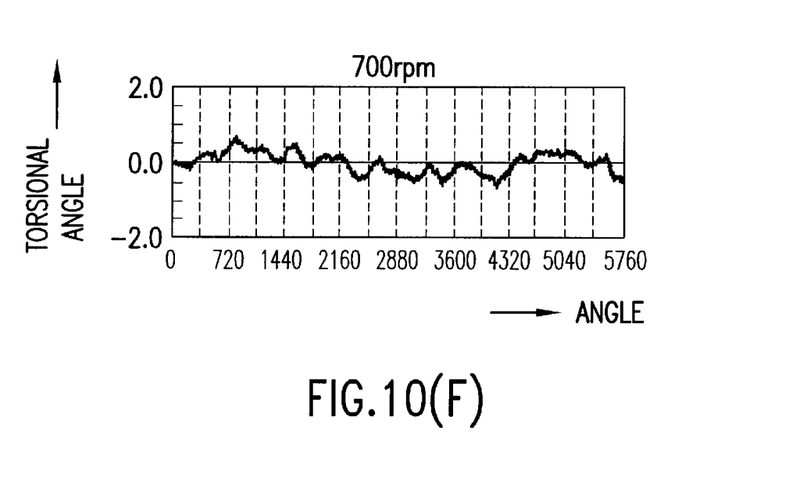

In the preferred embodiment, the data amendment is performed during the data transferring the measured data recorded in storage means 24 like S-RAM to RAM of notebook PC 35 or main PC 36. Then, the case may be supposed that torsional data are obtained every pulse period during 16 rotations of rotary shaft 2 (0° to 5760°) which is rotated at a predetermined certain speed (either of 580 r.p.m. and 700 r.p.m.) as shown in FIGS. 10C and 10D. When the start of data sampling at the rotational angle 0°, the rotational speed has become either 500 or 700 r.p.m. constantly. However, when the finishing thereof at the rotational angle 5760°, there appears fluctuation of rotation, whereby the data of the starting and finishing ends do not agree with each other. The resulting speed variety graphs 60 and 61 at the rotational speeds 580 and 700 r.p.m. have fluctuation elements in shapes shown in FIGS. 10C and 10D, thereby making analysis of the data difficult. Then, as shown in FIG. 10E, it may be supposed that a pulse timing at an angle 1500° is designated as $T_{n-1}$, the next at 2160° is as $T_n$, the further next at 2520° is as $T_{n+}$, and so on. A period between pulse timings $T_{n-1}$ and $T_n$ is designated as $\Delta T_{n-1}$, that between $T_n$ and $Tn_{+1}$ is as $\Delta T_n$, and that between $T_{n+1}$ and $T_{n+2}$ is as $\Delta T_n+$. When it is decided that $\Delta T_n$ is larger than $X_c$ at fourth step $STE_4$ of the flow chart shown in FIG. 9, period $\Delta T_n$ is replaced with the average of $\Delta T_{n-1}$ and $\Delta T_{n+1}$ ($\Delta T_n=(\Delta T_{n-1}$ and $\Delta Tn_{+1})/2$). Accordingly, speed variety graphs 60 and 61 shown in FIGS. 10C and 10D can be amended into those 62 and 63 shown in FIGS. 10E and 10F, so that even if the rotational speed at the last sampling is different from that at the first sampling.

According to the present invention as the above, data recording can be easily and certainly performed by the data logger for a limited time even in a small space of a ship or a power plant. The data logger separated from the notebook PC for data analysis becomes small and light as long as possible, thereby being portable. Additionally, since a rotational speed and a torsional angle can be displayed by the display means of the data logger, the check whether each datum is acceptable or not, or whether each datum is recorded or not can be performed in a worksite.

Since the data of rotational speed and torsional angle are recorded in a memory flush or a memory card, the capacities thereof can be analyzed by a notebook PC or a main PC after data recording.

The noise of torsional angle data caused by the seam of the striped tape or by the sensor can be amended by the method that the maximum amplitude of torsional angle during a rotation is averaged by the forward and rearward values, whereby a data jump caused across the seam of the tape can be amended so as to be analyzed. Even if there is some fluctuation of rotational speed, data can be stored, thereby reducing the time for measurement.

The torsional vibration measuring instrument according to the present invention has a portable data logger separated from a notebook pc as a data analyzer, so that data recording and judgement of the data can be performed in such a worksite as a narrow place in a ship or a power plant.

What is claimed is:

1. A torsional vibration measuring instrument comprising:
   a detection means for detecting a rotational period of an object to be rotated every predetermined angle within a certain number of rotation thereof;
   a storage means for recording said rotational periods detected by said detection means;
   an average calculation means for calculating an average of said detected rotational periods;
   a torsional angle calculation means for calculating a torsional angle of said object to be rotated in comparison between said calculated average and each detected rotational period;
   a display means for displaying at least an amplitude of said torsional angle;
   a striped tape serving as said detection means disposed around the periphery of said object to be rotated;
   a subtraction means for subtracting said detected rotational period from the immediately before or after detected rotational period;
   a comparison means for comparing said subtracted period with a standard period; and
   an amendment means for amending said subtracted period, which has a difference from the standard period more than a certain degree determined by said comparison means into an average of periods immediately before and after said subtracted period, wherein said storage means is detachable and portable.

2. The torsional vibration measuring instrument as set forth in claim 1, wherein said striped tape is colored across a seam thereof.

3. A torsional vibration measuring instrument comprising:
   a detection means for detecting a rotational period of an object to be rotated at every predetermined angle of rotation;
   a storage means for recording said rotational periods detected by said detection means;
   an average calculation means for calculating an average of said detected rotational periods;
   a subtraction means for subtracting said detected rotational period from the immediately before or after detected rotational period;
   a comparison means for comparing said subtracted period with a standard period;
   an amendment means for amending said subtracted period, which has a difference from the standard period more than a certain degree determined by said comparison means into an average of periods immediately before and after said subtracted period; and
   a torsional angle calculation means for calculating a torsional angle of said object to be rotated corresponding to each detected rotational period and for calculating at least one second torsional angle corresponding to said amended subtracted period;
   a display means for displaying at least one amplitude of said torsional angle and at least one amplitude of said second torsional angle.

4. The torsional vibration measuring instrument as set forth in claim 3, further comprising a striped tape serving as said detection means disposed around the periphery of said object to be rotated.

5. The torsional vibration measuring instrument as set forth in claim 4, wherein said striped tape is colored across a seam thereof.

6. The torsional vibration measuring instrument as set forth in claim 4, therein a resulting extended last stripe has a pitch in the range of 1.5 to 3.5 a pitch of other stripes.

7. The torsional vibration measuring instrument as set forth in claim 6, wherein the resulting extended last stripe has a pitch in the range of 1.5 to 2 a pitch of other stripes.

8. The torsional vibration measuring instrument as set forth in claim 6, wherein the resulting extended last stripe has a pitch in the range of 2 to 3 a pitch of other stripes.

9. The torsional vibration measuring instrument as set forth in claim 6, wherein the resulting extended last stripe has a pitch in the range of 3 to 3.5 a pitch of other stripes.

* * * * *